(12) United States Patent
Yu et al.

(10) Patent No.: US 8,068,352 B2
(45) Date of Patent: Nov. 29, 2011

(54) POWER INVERTER CONTROL FOR GRID-TIE TRANSITION

(75) Inventors: Dachuan Yu, Normal, IL (US); Mahesh Sitaram Illindala, Dunlap, IL (US); Osama Mohammad Alkhouli, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 518 days.

(21) Appl. No.: 12/318,012

(22) Filed: Dec. 19, 2008

(65) Prior Publication Data

US 2010/0157634 A1 Jun. 24, 2010

(51) Int. Cl.
*H02M 3/335* (2006.01)
*H02H 7/122* (2006.01)
(52) U.S. Cl. .................... 363/17; 363/56.02; 363/56.05; 363/131; 307/16
(58) Field of Classification Search ............... 363/17, 363/56.02, 56.03, 56.05, 131, 132; 307/16
See application file for complete search history.

(56) References Cited

U.S. PATENT DOCUMENTS

| | | | |
|---|---|---|---|
| 5,268,832 A | 12/1993 | Kandatsu | |
| 5,596,492 A | 1/1997 | Divan et al. | |
| 6,058,035 A | 5/2000 | Madenokouji et al. | |
| 6,219,623 B1 * | 4/2001 | Wills | 702/60 |
| 6,282,104 B1 | 8/2001 | Kern | |
| 6,304,468 B2 | 10/2001 | Ichinose et al. | |
| 6,339,538 B1 | 1/2002 | Handleman | |
| 6,429,546 B1 | 8/2002 | Ropp et al. | |
| 6,603,290 B2 * | 8/2003 | Hochgraf | 322/37 |
| 6,810,339 B2 * | 10/2004 | Wills | 702/65 |
| 6,850,074 B2 * | 2/2005 | Adams et al. | 324/527 |
| 6,949,843 B2 | 9/2005 | Dubovsky | |
| 7,116,010 B2 | 10/2006 | Lasseter et al. | |

(Continued)

FOREIGN PATENT DOCUMENTS

KR 1020070056264 6/2007

OTHER PUBLICATIONS

Y.C. Shin et. al., Development of Unitary 120kW PCS for Grid-Connected Photo-Voltaic Power Generation, Proceeding of the KIPE '06, Jun. 2006, pp. 188-190.

(Continued)

*Primary Examiner* — Bao Q Vu
(74) *Attorney, Agent, or Firm* — Finnegan, Henderson, Farabow, Garrett & Dunner LLP (57) ABSTRACT

A control system for a power inverter is disclosed. The power inverter may be configured to supply power to a grid. The control system may include a plurality of output voltage sensors and a plurality of output current sensors configured to measure output line voltages and output line currents of the power inverter. The control system may further include a controller coupled to the power inverter. The controller may be configured to provide a control signal associated with a disturbance frequency to the power inverter. The controller may be further configured to determine an output power of the power inverter based on the output line voltages and output line currents, and determine an amplitude of oscillation in the output power caused by the disturbance frequency. The controller may also be configured to detect an islanding condition, if the amplitude of oscillation is below a threshold. The control system may further include an interface circuit coupled to the controller and configured to disconnect the grid from the power inverter if the islanding condition is detected.

20 Claims, 5 Drawing Sheets

U.S. PATENT DOCUMENTS

| | | |
|---|---|---|
| 7,158,395 B2 | 1/2007 | Deng et al. |
| 7,164,590 B2 | 1/2007 | Li et al. |
| 7,177,165 B2 | 2/2007 | Deng et al. |
| 7,184,282 B2 | 2/2007 | Ohshima et al. |
| 7,256,566 B2 | 8/2007 | Bhavaraju et al. |
| 7,324,361 B2 | 1/2008 | Siri |
| 7,403,404 B2 | 7/2008 | Oka et al. |
| 7,408,268 B1 * | 8/2008 | Nocentini et al. ............... 307/16 |
| 7,495,936 B2 * | 2/2009 | Ohshima et al. ................. 363/36 |
| 7,945,413 B2 * | 5/2011 | Krein ........................... 702/111 |
| 2007/0200607 A1 * | 8/2007 | Ohshima et al. ............... 327/256 |
| 2007/0216373 A1 | 9/2007 | Smedley et al. |
| 2008/0123381 A1 | 5/2008 | Konishi et al. |
| 2008/0205096 A1 | 8/2008 | Lai et al. |

OTHER PUBLICATIONS

Staunton, R.H. et al., *Microturbine Power Conversion Technology Review*, Oak Ridge National Laboratory, ORNL/TM-2003/74, Apr. 8, 2003, 40 pages.

\* cited by examiner

POWER INVERTER CONTROL FOR GRID-TIE TRANSITION

TECHNICAL FIELD

This application relates to power inverter control for grid-tie transition, and more particularly, to anti-islanding power inverter control for grid-tie transition.

BACKGROUND

A power system may include distributed power sources, such as photovoltaic DC power or fuel cell DC power, to provide power supply to distributed power utilities. A power inverter is usually used between the power source and the loads to adapt the power supply to the power usage. For example, a power system may include a 3-phase inverter module that inverts the DC power to 3-phase AC power. The 3-phase AC power may be supplied to the loads.

Two types of loads are usually driven by the power supply in parallel: internal critical loads that are associated with the local loads at the distributed power source, and grid loads that are distributed among various utilities. The grid loads may be connected to the power inverter via an output contactor. When the grid loads are connected, the power inverter is said to work at a "grid-tie" mode, and when the grid loads are disconnected, the power inverter is said to work at a "stand-alone" mode. For example, when there is a shorting problem on the power transmission line, the grid loads will be disconnected, and the only loads supplied by the power will be the internal critical loads.

During the "grid-tie" mode and the "stand-alone" mode, the operation of the power inverter may be substantially different. Therefore, when the grid loads are suddenly disconnected, for example, due to a transmission line shorting, control of the power inverter may jump from one operation mode to the other operation mode. Such a non-smooth transition from a "grid-tie" mode to a "stand-alone" mode is typically known as an "islanding" condition. Conventionally, in order to maintain the operation of power inverter, two separate power controllers have to be configured separately for the two modes. For example, one controller may operate under "grid-tie" mode when the grid loads are connected, and the other controller may take over and operate under stand-alone mode when the grid loads are disconnected. However, the switch between the two power controllers may cause various issues. For example, it may cause a voltage dip that may shut down a sensitive local load such as a variable frequency drive (VFD).

One power converter system designed to prevent an over-current during the transition between the two operation modes is described in U.S. Pat. No. 6,304,468 to Ichinose et al. ("the '468 patent"). The power converter system described in the '468 patent includes a circuit breaker connecting a load to the power system. When the circuit breaker is closed, the power converter may change from a self commutated operation to a grid connected operation. The '468 patent describes a power converter controller that matches the phase of an output voltage of the power converter to the phase of the system voltage. In particular, the power converter controller uses the voltage on the system side of the circuit breaker to adjust the output phase of the converter system. According to the '468 patent, the circuit breaker can be closed when the output phase coincides with the phase of the system voltage.

Although the power converter system described in the '468 patent may be effective to make the transition between the two operation modes, it may nevertheless be suboptimal. For example, the power converter system described in the '468 patent may not be robust because it does not have effective islanding detection and prevention functions. Therefore, when an islanding condition occurs, a voltage dip may occur during the transition from the grid connected operation to the self commutated operation. As a result, local loads such as VFDs may be shut down due to the voltage dip, and the power system may be rendered inoperative.

In addition, an AC voltage may be characterized by three parameters, amplitude, frequency, and phase. Although the power converter controller of the '468 patent matches the phase of the converter output voltage to the system voltage, it does not effectively match the amplitude and frequency of these two voltages. For this additional reason, power converter system described in the '468 patent may not achieve a smooth grid-tie transition.

The disclosed power inverter control system and method are directed towards overcoming one or more of the problems set forth above.

SUMMARY

In one aspect, the present disclosure is directed to a control system for a power inverter. The power inverter may be configured to supply power to a grid. The control system may include a plurality of output voltage sensors and a plurality of output current sensors configured to measure output line voltages and output line currents of the power inverter. The control system may further include a controller coupled to the power inverter. The controller may be configured to provide a control signal associated with a disturbance frequency to the power inverter. The controller may be further configured to determine an output power of the power inverter based on the output line voltages and output line currents, and determine an amplitude of oscillation in the output power caused by the disturbance frequency. The controller may also be configured to detect an islanding condition, if the amplitude of oscillation is below a threshold. The control system may further include an interface circuit coupled to the controller and configured to disconnect the grid from the power inverter if the islanding condition is detected.

In another aspect, the present disclosure is directed toward a control method for a power inverter. The power inverter may be configured to supply power to a grid. The control method may include providing a control signal associated with a disturbance frequency to the power inverter, and determining an amplitude of oscillation in an output power of the power inverter, wherein the oscillation is caused by the disturbance frequency. The control method may further include detecting an islanding condition, if the amplitude of oscillation is below a threshold. The control method may also include disconnecting the grid from the power inverter if the islanding condition is detected.

DETAILED DESCRIPTION

Figure 1:
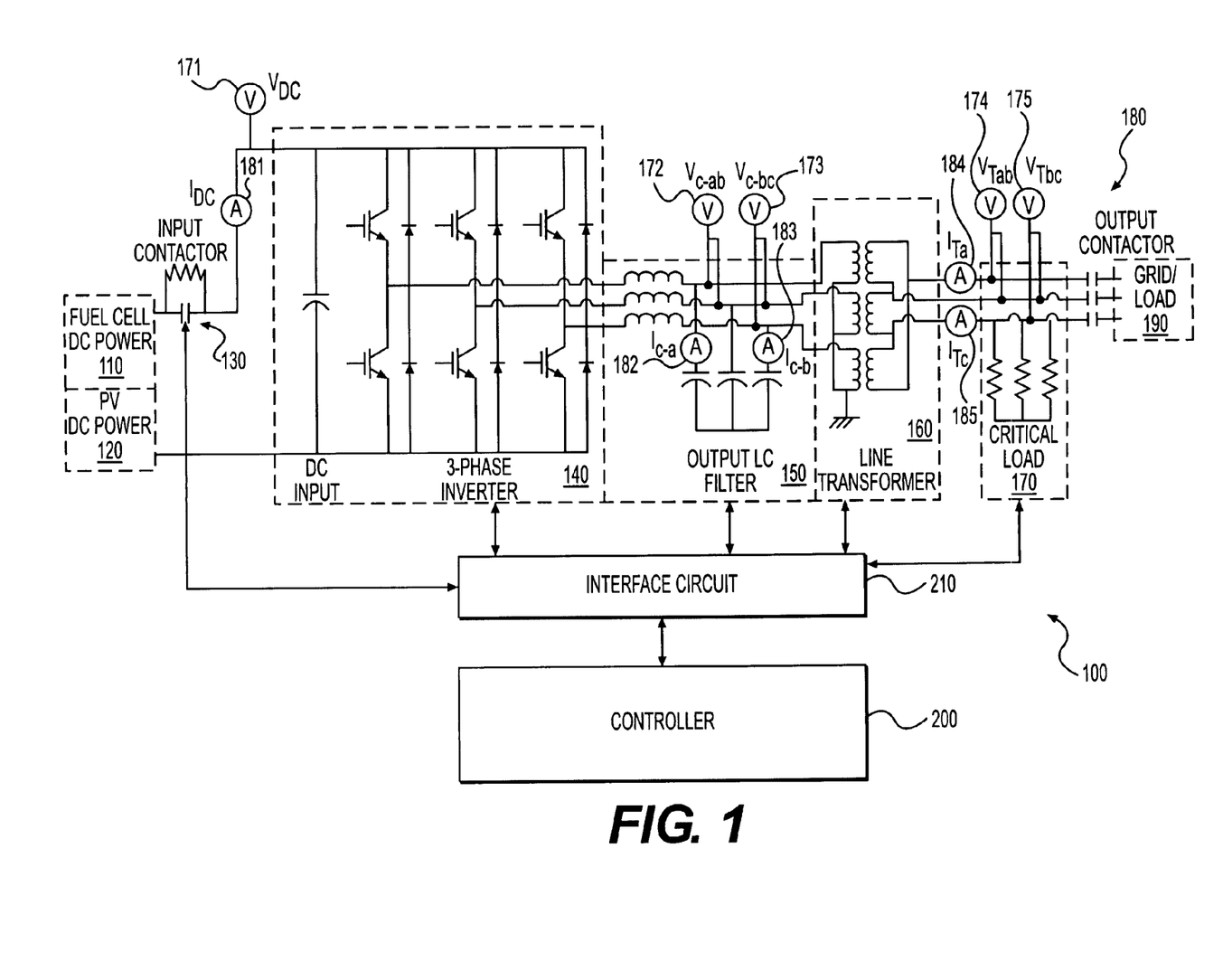
FIG. 1 illustrates an exemplary power system with a control system for a power inverter, consistent with an embodiment of the present disclosure.

FIG. 1 illustrates an exemplary power system 100 with a control system for a power inverter, consistent with an embodiment of the present disclosure. Power system 100 may include one or more power sources such as fuel cell power source 110 and photovoltaic power source 120, an input contactor 130, a power inverter 140, an output LC filter 150, a line transformer 160, a critical load 170, an output contactor 180, and a grid 190. The operation of power system 100 may be controlled by a control system, which may include various voltage and current sensors (e.g., voltage sensors 171-175, and current sensors 181-185), a controller 200, and an interface circuit 210 coupling controller 200 to one or more components of power system 100 and the various voltage and current sensors.

Power system 100 may convert the power provided by one or more power sources and supply the power to the loads connected to the system. Consistent with the present disclosure, the one or more power sources may supply DC power to power system 100. In some embodiments, power system 100 may combine renewable power sources with traditional fuel based power sources, such as diesel power. In some other embodiments, power system 100 may also combine several renewable power sources, such as fuel cell power source 110 and photovoltaic power source 120. It is contemplated that any other suitable DC power sources may be incorporated in power system 100.

Input contactor 130 may be a circuit breaker that can be switched on and off remotely. When input contactor 130 is closed, power sources 110 and 120 are connected to power system 100 so that DC power may be supplied to power system 100. Otherwise, when input contactor 130 is open, power sources 110 and 120 are disconnected from power system 100 and power system 100 may shut down.

When input contactor 130 is closed, power inverter 140 may be configured to convert the DC power supplied by power sources 110 and 120 to an AC power that complies with the load needs. For example, power inverter 140 may provide AC voltage and/or current outputs to drive critical load 170 and/or grid 190. It is contemplated that power system 100 may include more than one power inverter. The multiple power inverters may be connected in parallel and each may be configured to convert a portion of the DC power.

Power inverter 140 may have at least one phase, and each phase may include at least one power transistor. For example, as shown in FIG. 1, power inverter 140 may have three phases and six power transistors, so that it may convert a DC power to a three-phase AC power. Each power transistor may be switched on and off by its corresponding gate driving circuit. For the purpose of illustration, IGBTs are shown and discussed in the present disclosure. However, it is contemplated that the disclosed system and method may be applicable to other suitable power transistors including, but not limited to, BJT, the Darlington device, and MOSFET.

The power transistors may be switched according to a switching scheme, such as pulse width modulation (PWM), to modulate the voltage that is output from power inverter 140. In some embodiments, controller 200 may be coupled to power inverter 140 via interface circuit 210 to provide gate driving signals to the power transistors.

Output LC filter 150 may be configured to filter the AC output of power inverter 140. For example, an AC voltage of a particular frequency may be desired by the loads, but the AC output of power inverter 140 may usually contain harmonics and/or noises of other frequencies. Output LC filter 150 may be configured to filter out these harmonics and/or noises before the AC voltage is supplied to the loads. In some embodiments, output LC filter 150 may have an equal number of phases as power inverter 140. Each phase may include one or more inductances (usually noted with "L") and one or more capacitors (usually noted with "C").

Power system 100 may further include a line transformer 160 to adjust the AC voltage to a desired level. Line transformer 160 may be electrically coupled to output LC filter 150. In some embodiments, line transformer 160 may have an equal number of phases as power inverter 140 and output LC filter 150. Each phase may include a primary winding and a secondary winding of inductively coupled wires, and may be configured to scale the secondary induced AC voltage from the primary AC voltage by a factor equal to the ratio of the number of turns of wire in their respective windings. For example, line transformer 160 may have a scale factor of 1:2, so that a voltage of 190 volts may be stepped up to 380 volts. In some embodiments, if the output voltage of power inverter 140 is of the desired level, line transformer 160 may be omitted.

Two types of loads may be driven by power system 100. One type of load is critical load 170, which are local loads associated with power system 100. Examples of critical load 170 may include, for example, resistors, inductors and capacitors at power sources 110 and 120. The other type of load is grid 190, which are loads remotely distributed among various utilities. Examples of grid 190 may include, for example, consumer electronics at various households, factories, office facilities, distributed power stations, and distributed power sources. When power sources are connected to power system 100 as grid 190, they may act as power generators that feed power back to power system 100, instead of power consumers.

In some embodiments, grid 190 may be connected to power system 100 via an output contactor 180. Similarly to input contactor 130, output contactor 180 may be a circuit breaker that can be switched on and off remotely. In some embodiments, output contactor 180 may have an equal number of phases as power inverter 140 and output LC filter 150, and each phase may include a circuit breaker. When output contactor 180 is closed, grid 190 is connected to power system 100. Accordingly, power inverter 140 may work under a "grid-tie" operation mode to supply AC power to both critical load 170 and grid 190. Otherwise, when output contactor 180 is open, grid 190 is disconnected from power system 100. Accordingly, power inverter 140 may work under a "stand-alone" operation mode to supply AC power to only critical load 170. Grid 190 may also be disconnected due to reasons other than physical switch of output contactor 180. For example, a shorting may occur at grid 190 or the transmission line. In these cases, islanding conditions may occur and the operation of power inverter 140 may be adjusted to "stand-alone" mode immediately, in order to protect power system 100.

Compared to critical load 170, loads of grid 190 may be significantly higher. Consequently, a change between the two operation modes may significantly change the power needs of power system 100. That is, the "grid-tie" operation mode and "stand-alone" operation mode may differ from each other. Besides, during "grid-tie" operation mode, the power flow is decided by the phase and voltage difference between two voltage sources. Therefore, if the transition between the two operation modes is not smooth, various problems may occur that affect the reliability and efficiency of power system 100.

A control system may be included to avoid or mitigate these transition problems. As shown in FIG. 1, the control system may include various voltage and current sensors (e.g., voltage sensors 171-175, and current sensors 181-185), a controller 200, and an interface circuit 210 coupling controller 200 to one or more components of power system 100 and the various voltage and current sensors. It is contemplated that the control system may include more components than those shown in FIG. 1.

Voltage sensor 171 may be a DC voltage sensor configured to measure the DC input voltage near input contactor 130. Similarly, current sensor 181 may be a DC current sensor configured to measure the DC input current near input contactor 130. Voltage sensors 172-175 may be AC voltage sensors configured to measure AC line voltages. For example, voltage sensors 172 and 173 may measure the line voltages at output LC filter 150, and voltage sensors 174 and 175 may measure the line voltages at a point right after line transformer 160. Consistent with the present disclosure, an AC line voltage is the voltage between two AC power lines, where each power line corresponds to a phase of the voltage. For example, voltage sensor 174 measures the line voltage between phase "a" and phase "b", and voltage sensor 175 measures the line voltage between phase "b" and phase "c". Accordingly, current sensors 182-185 may be AC current sensors configured to measure AC line currents. Consistent with the present disclosure, an AC line current is the current flowing through an AC power line. For example, current sensors 182 and 184 measure the line currents of phase "a" at output LC filter 150 and line transformer 160, respectively.

The voltage and current measurements may be communicated to controller 200 via communication lines, such as a data link and interface circuit 210. Interface circuit 210 may include one or more circuit boards operable to communicate with various components of power system 100, the voltage sensors and current sensors, and controller 200. In some embodiments, interface circuit 210 may include one or more communication devices, such as a network card, a wireless transceiver, or any other device for providing a communication interface between controller 200 and other components. For example, interface circuit 210 may collect measurements from voltage and current sensors 171-175 and 181-185. As another example, interface circuit 210 may provide switching signals determined by controller 200 to the gates of IGBTs in power inverter 140. Interface circuit 210 may also send control signals to input contactor 130 and output contactor 180 to remotely switch them on and off.

Controller 200 may be coupled to various components of power system 100 via interface circuit 210. Controller 200 may be configured to detect an islanding condition when grid 190 is suddenly disconnected and immediately transit from the "grid-tie" mode to the "stand-alone" mode. Controller 200 may provide control signals to power inverter 140 during the transition. For example, controller 200 may be configured to determine a target amplitude and a target frequency for an output voltage of power inverter 140. Controller 200 may be further configured to determine a plurality of power transistor switching pulses based on the target amplitude and the target frequency.

Figure 2:
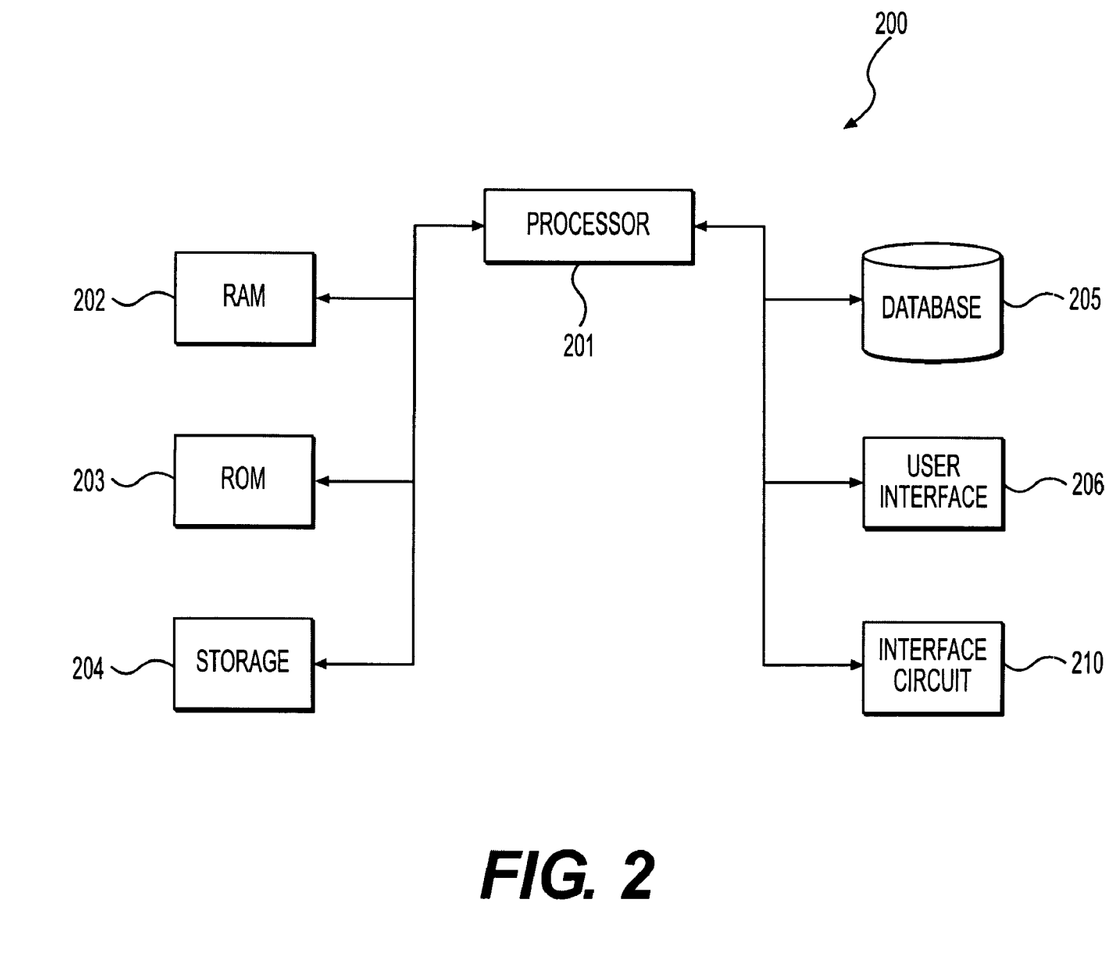
FIG. 2 illustrates an exemplary controller, consistent with an embodiment of the present disclosure.

FIG. 2 illustrates an exemplary controller 200, consistent with an embodiment of the present disclosure. Controller 200 may include any means for collecting, analyzing, monitoring, storing, reporting, analyzing, optimizing, and/or communicating data. For example, controller 200 may include a central processing unit (CPU) 201, a random access memory (RAM) 202, a read only memory (ROM) 203, a storage 204, a database 205, and a user interface 206. In some embodiments, interface circuit 210 may be included as an internal component of controller 200. Controller 200 may be configured to execute and run software programs that collect, analyze, store, transmit, organize, and/or monitor various data associated with power system 100.

CPU 201 may include one or more processors that can execute instructions and process data to perform one or more processes associated with power system 100. For instance, CPU 201 may execute software that enables controller 200 to request and/or receive voltage and current measurements from one or more voltage sensors 171-175 and current sensors 181-185. Based on the collected voltage and current measurements, CPU 201 may calculate an out power of power inverter 140, and determine if an islanding condition has occurred. For example, CPU 201 may detect an amount of oscillation in the output power. In case of an islanding condition, CPU 201 may determine control signals to adjust the operation mode of power inverter 140. For example, CPU 201 may calculate the DC power input supplied by power sources 110 and 120, and calculate the AC power output demanded by critical load 170 and grid 190. CPU 201 may then calculate a target amplitude and a target frequency for an output voltage of power inverter 140, so that supply may match with demand. CPU 201 may further execute software tools such as a power width modulator (PWM) to determine power transistor switching pulses, based on the target amplitude and the target frequency.

Consistent with one embodiment, storage 204 may include a mass media device operable to store any type of information needed by CPU 201 to perform control processes associated with power system 100. For example, storage 204 may store the collected DC and AC voltages and currents associated with power system 100. Storage 204 may include one or more magnetic or optical disk devices, such as hard drives, CD-ROMs, DVD-ROMs, USB flash drives or any other type of mass media device.

Database 205 may include a collection of data stored on one or more memory devices. Database 205 may include data used by CPU 201. For example, database 205 may include the collected voltages and currents, determined target amplitude and frequency of the inverter output voltage, and switching pulse information for driving the power transistors.

User interface 206 may include hardware and/or software components that allow a user to input or access information stored in controller 200. User interface 206 may include a graphical user interface (GUI) that allows external users to input control instructions. For example, the external users may instruct to connect or disconnect grid 190 from power system 100. User interface 206 also may allow a user to monitor the operation of power system 100. For example, user interface 206 may include a data access interface that allows external users to access, configure, store, and/or download information to external systems, such as computers, PDAs, diagnostic tools, or any other type of external data device. Moreover, user interface 206 may allow a user to access and/or override control decisions made by CPU 201.

Figure 3:
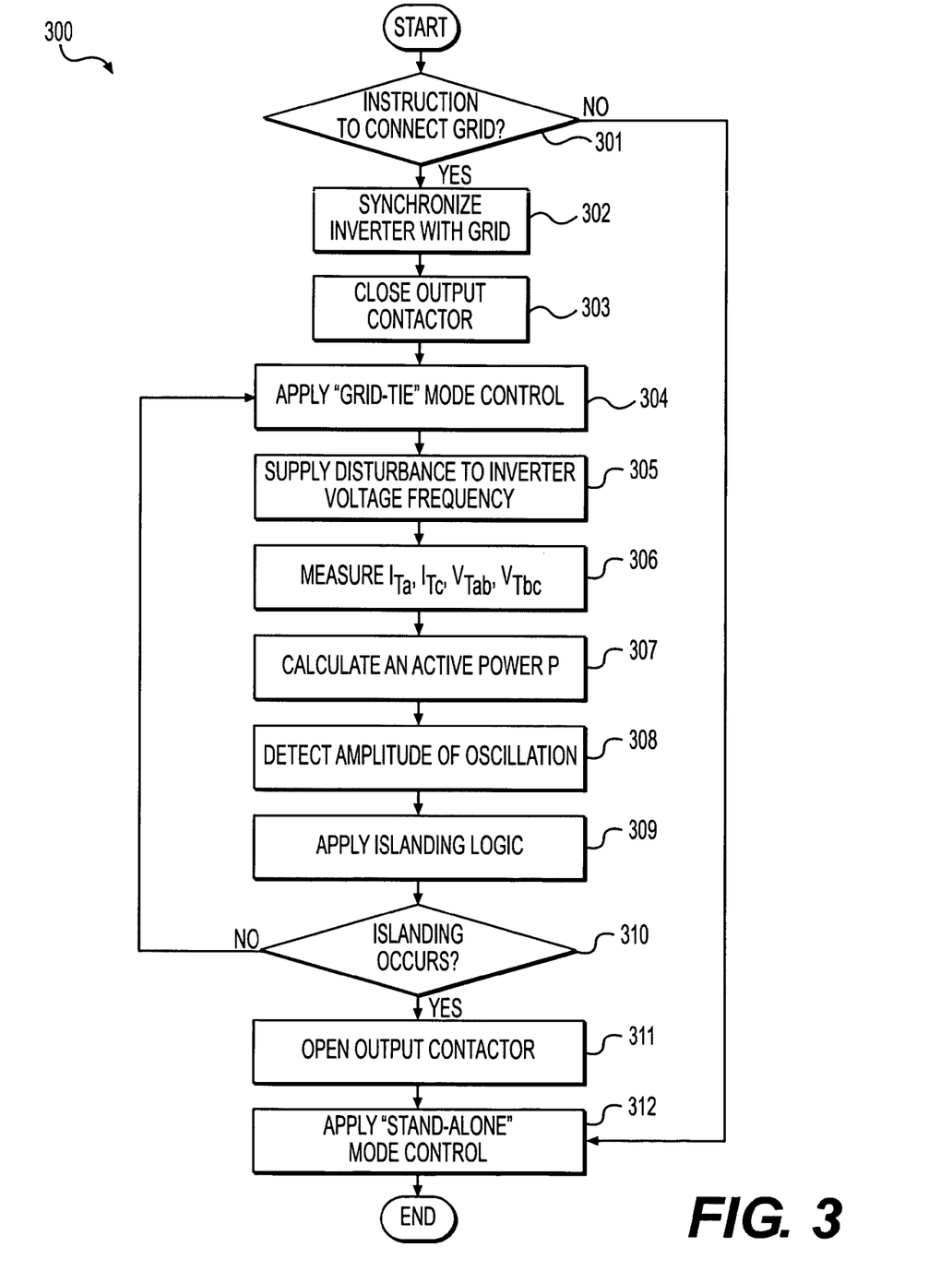
FIG. 3 provides a flowchart illustrating an exemplary power inverter control process, consistent with an embodiment of the present disclosure.

FIG. 3 provides a flowchart illustrating an exemplary power inverter control process 300, consistent with an embodiment of the present disclosure. Power inverter control process 300 may begin when input contactor 130 is closed and power system 100 is on. Controller 200 may determine if an instruction to connect grid 190 is received (Step 301). For example, a user may input the instruction via user interface 206.

If the instruction is received (Step 301: Yes), controller 200 may be configured to synchronize power inverter 140 with grid 190 (Step 302), before contactor 180 is closed. In some embodiments, controller 200 may calculate the AC power at the critical load 170 and adjust the output line voltages at power inverter 140 according to a difference between the calculated power and a reference power. For example, in order to adjust the output line voltages, controller 200 may provide switching pulses to drive the power transistors of power inverter 140. After power inverter 140 is synchronized with grid 190, controller 200 may send a control signal to close output contactor 180 (Step 303).

After output contactor 180 is closed, controller 200 may apply "grid-tie" mode control on power inverter 140 (Step 304). For example, controller 200 may calculate a target amplitude ("|Vinv|") and a target frequency ("finv") for an output voltage of power inverter 140, so that the DC power input supplied by power sources 110 and 120 may match with the AC power output demanded by critical load 170 and grid 190. In some embodiments, controller 200 may derive the target amplitude and target frequency using two separate feedback loops. Details of the feedback control scheme will be described in connection with FIG. 4. Controller 200 may further determine power transistor switching pulses and provide the switching pulses to power inverter 140 via interface circuit 210.

In addition to the regular "grid-tie" mode control, controller 200 may add a disturbance frequency to the target voltage frequency of power inverter 140 (Step 305). In some embodiments, a sinusoidal disturbance frequency may be added to the target voltage frequency. Consistent with the present disclosure, the disturbance frequency may be selected to be within the bandwidth of the closed control system. When grid 190 is connected, the output power delivered by power inverter 140 may oscillate around the desired power of grid 190 and critical load 170. In some embodiments, the amplitude of the disturbance frequency may be very small to keep the power oscillation at an acceptable level. However, when an islanding condition occurs and the loads and power inverter 140 are matched, the output power of power inverter 140 cannot oscillate since the loads can only extract fixed amount of power from power inverter 140. Therefore, the islanding condition may be detected based on the amplitude of the oscillation in the output power.

In step 306, controller 200 may continuously receive AC voltage and current measurements from voltage sensors 174 and 175 and current sensors 184 and 185 near line transformer 160. Voltage sensor 174 may measure the line voltage between phase "a" and phase "b" ("Vtab"), and voltage sensor 175 may measure the line voltage between phase "b" and phase "c" ("Vtbc"). Accordingly, current sensors 184 and 185 measure the line currents of phase "a" ("Ita") and phase "c" ("Itc"), respectively.

Based on the voltage and current measurements, controller 200 may calculate an active power P (Step 307). In a DC circuit, voltage and current waveforms are in phase, changing polarity at the same instant in each cycle. Therefore, a DC power always takes a real value. Unlike a DC power, an AC power may take a complex value, depending on the characteristic of the system loads. For example, where reactive loads are present, such as with capacitors or inductors, energy storage in the loads result in a time difference between the current and voltage waveforms. The part of power that is available to do work (i.e., the real part of the complex value) is called active power (a.k.a. real power), and the part of power that is not available to do work at the load is called reactive power (i.e., the imaginary part of the complex value). Consistent with the present disclosure, controller 200 may calculate a complex AC power based on the voltage and current measurements in step 305. Controller 200 may take the real part of the complex power as active power P in step 307.

Due to the disturbance added in step 304, active power P may include an oscillation. In step 308, the amplitude of the oscillation may be detected. In some embodiments, a band pass filter (BPF) may be applied to the calculated active power P, and the amplitude of the oscillation in the filtered active power may be detected by an amplitude detector. An islanding logic may be applied to the detected amplitude (Step 309). For example, the islanding logic may be used to determine if the amplitude of the oscillation is below a threshold. In some embodiments, the threshold may be a nominal value selected by the user. Based on the islanding logic, controller 200 may determine if an islanding condition has occurred (Step 310). For example, if the amplitude is below a threshold, the islanding condition may be detected (Step 310: Yes). Accordingly, controller 200 may open output contactor 180 to protect power system 100 (Step 311). Otherwise, if no islanding condition is detected (Step 310: No), controller 200 may continue applying "grid-tie" mode control to power inverter 140 (Step 304).

After output contactor 180 is open or if no instruction is received (Step 301: No), in step 312, controller 200 may set the amplitude of the output voltage of power inverter 140 as a nominal voltage amplitude ("|Vnom|"). Controller 200 may also set the frequency of the output voltage of power inverter 140 as a nominal voltage frequency ("fnom"). In some embodiments, nominal amplitude |Vnom| and nominal frequency fnom may be pre-determined and written in controller 200. For example, |Vnom| and fnom may be determined based on the DC power input supplied by power sources 110 and 120, as well as critical load 170. Power inverter control process 300 may conclude after step 312.

Figure 4:
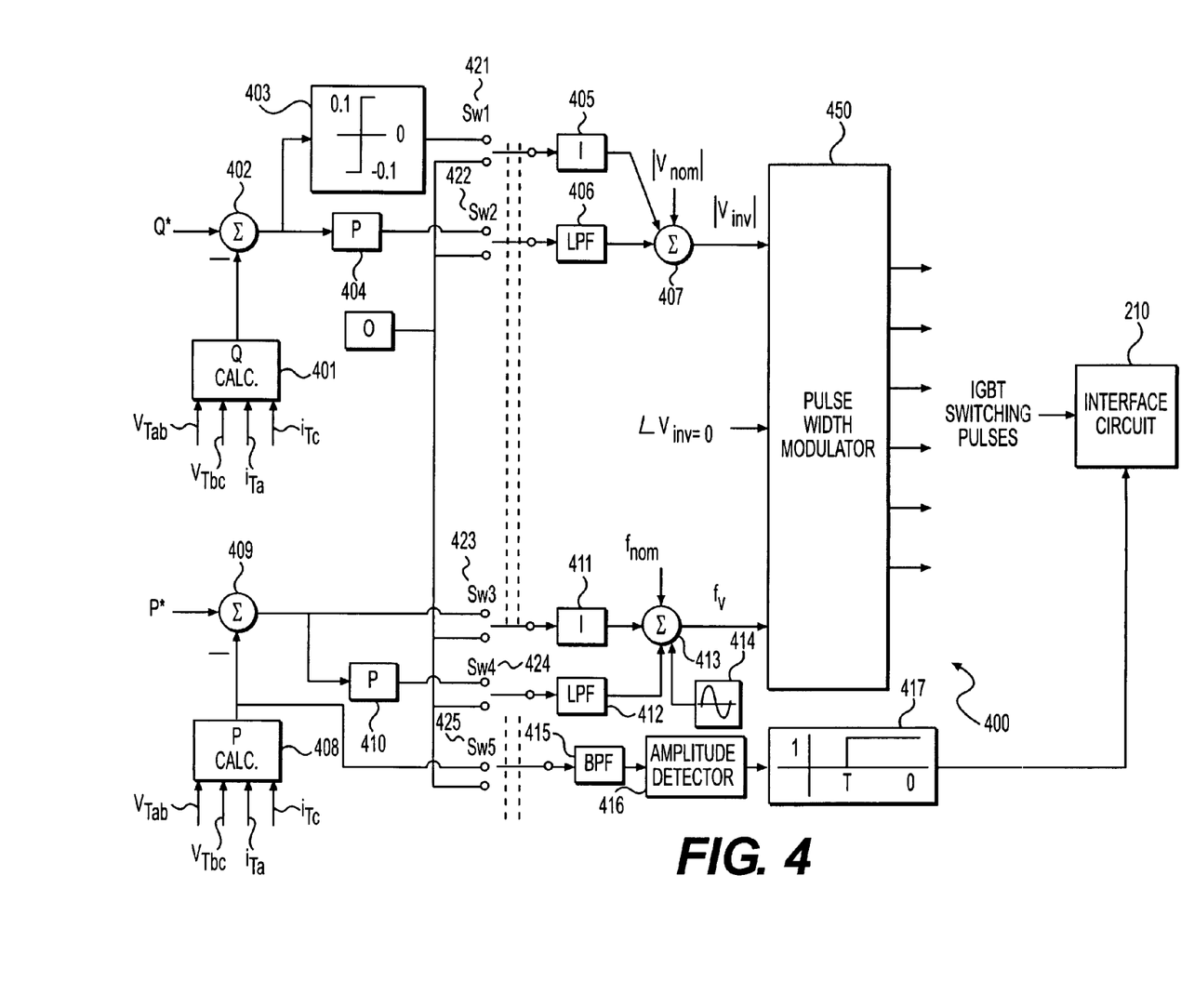
FIG. 4 provides an exemplary feedback control scheme of the controller disclosed in FIG. 2, consistent with an embodiment of the present disclosure.

FIG. 4 provides an exemplary feedback control scheme 400 of controller 200 disclosed in FIG. 2, consistent with an embodiment of the present disclosure. Feedback control scheme 400 may be used to detect islanding conditions, and derive the inverter voltage amplitude ("|V|") and inverter voltage frequency ("fv") for both "grid-tie" operation and "stand-alone" operation. Feedback control scheme 400 as shown in FIG. 4 may include two feedback loops for |V| and fv, respectively.

Feedback control scheme 400 may include switches 421-425. Each switch may have two switching statuses: an upper position ("1 position") and a lower position ("0 position"). Switching one or more of switches 421-425 may adapt feedback control scheme 400 to two different operation modes: "stand-alone" operation mode and "grid-tie" operation mode. Consistent with the present disclosure, during "stand-alone" operation, grid 190 is disconnected from power system 100. Accordingly, switches 421-425 are all at the lower position. Under "stand-alone" operation mode, |V| may be set as nominal amplitude |Vnom| at decision node 407, since the other two inputs (from integrator 405 and low pass filter (LPF) 406) to decision node 407 are both 0. Similarly, fv may be set as nominal frequency fnom at decision node 413.

When an instruction to connect grid 190 is received, switch 424 may be switched to the upper position and switches 421-423 and 425 may remain at the lower position. Accordingly, power inverter 140 may be synchronized before switches 421-423 and 425 may be closed. An active power P may be calculated by a P calculator 402, based on the line voltages Vtab and Vtbc and line currents Ita and Itc measured at critical load 170. The calculated active power P may be compared with a reference active power P* at a comparison node 409. The reference active power P* may be determined using a MPPT tool. An exemplary MPPT process may be described in connection with FIG. 5. A differential power of P and P* may be calculated at comparison node 409. Consistent with the present disclosure, a differential power is the difference between a measured power and a reference power. For example, the differential power calculated at comparison node 409 is the difference between calculated active power P and the reference active power P*. The differential power may go through a frequency droop loop.

As a first step of the frequency droop operation, the differential power may be fed into a proportional controller 410 which may be configured to amplify the differential power. As a second step, the amplified differential power may be fed into low pass filter (LPF) 412. LPF 412 may be configured to filter out high frequency components in the differential power. For example, noises may be filtered out. The filtered differential power may be sent to decision node 413 for determining the target frequency fv of the inverter output voltage. Since both switch 421 and switch 422 remain at the lower position, decision node 407 may remain outputting the nominal amplitude |Vnom| as the target amplitude of the inverter output voltage |Vinv|.

After output contactor 180 is closed, all switches 421-425 may be switched to the upper position. Accordingly, power inverter 140 may work under a "grid-tie" operation mode. A reactive power Q may be calculated by a Q calculator 401, based on the measured line voltages Vtab and Vtbc and line currents Ita and Itc. The calculated reactive power may be compared with the determined reference reactive power Q* at a comparison node 402. A differential power of Q and Q* may be calculated at comparison node 402. The differential power may go through a voltage droop loop and an integration loop in a parallel manner. During the voltage droop loop, the differential power may be fed into a proportional controller 404 where the difference may be amplified. The amplified difference may then be filtered by LPF 406. Use of low pass filter 406 may help make the transition between "stand-alone" and "grid-tie" operation modes seamless.

In some embodiments, an integration loop may be included to mitigate steady-state error. During the integration loop, the differential power may be first regulated by a regulator 403. In some embodiments, if the differential power is greater than 0, regulator 403 may output 0.1 regardless of the real value of the differential power. If the differential power is below 0, regulator 403 may output −0.1. If the differential power is 0, regulator 403 may output 0. It is contemplated that regulator 403 may be designed with different set values. It is contemplated that regulator 403 may be any type of regulator known in the art. The regulated differential power may be fed into integrator 405. Integrator 405 may compute an integral of the regulated differential power. The filtered differential power by low pass filter 406 and the integrated differential power by integrator 405 may both be sent to decision node 407. Decision node 407 may be configured to determine the target amplitude |V| of the inverter output voltage.

On the other hand, similar to the reactive power, an active power P may be calculated by a P calculator 408 and the differential power of the calculated active power P and the reference active power P* may be determined at a comparison node 409. Under the "grid-tie" operation mode, the difference between active power P and reference active power P* may go through a frequency droop loop (including proportional controller 410 and LPF 412). In addition to the frequency droop loop, the differential power may also go through an additional integration loop, because switch 423 is at the upper position. Again, the integration loop may be included to mitigate steady-state error. During the integration loop, the differential power may be fed into integrator 411. Integrator 411 may compute an integral of the differential power.

The filtered differential power by LPF 412 and the integrated differential power by integrator 411 may both be sent to decision node 413 where a target frequency is determined for the output voltage of power inverter 140. During the "grid-tie" operation mode, a disturbance generator 414 may also be included to supply disturbance frequency signal to the decision node 413. The disturbance frequency may be added on top of the target frequency. In some embodiment, the disturbance frequency may be a sinusoidal disturbance frequency. The disturbance frequency signal may be designed within the bandwidth of the closed feedback control scheme 400, so that a considerable amount of oscillation may be generated in the active power P.

Consistent with one embodiment, when more than one power inverters are include in power system 100, multiple disturbance generators may be used for the power inverters. In that case, the phases of the disturbances may be synchronized to prevent the oscillations associated with different power inverters from canceling out each other.

Switch 425, when switched to the upper position, may connect an anti-islanding control loop. The anti-islanding control loop may be configured to detect an islanding condition based on the amplitude of the oscillation in active power P. In some embodiments, the calculated active power P may be filtered by a band pass filter (BPF) 415. Consistent with some embodiments, the pass band of BPF 415 may be set by the user, based on the disturbance frequency and the bandwidth of the closed feedback control scheme 400. For example, the pass band may be designed such that the filtered active power substantially includes the oscillation generated by the disturbance frequency. The filtered active power may be passed on to an amplitude detector 416 where the amplitude of the oscillation is detected.

The detected amplitude may be sent to an islanding logic block 417. In some embodiments, islanding logic block 417 may apply a threshold ("T") to the amplitude. For example, if the amplitude is above T, islanding logic block 417 may output 1, and otherwise, islanding logic block 417 may output 0. The output of islanding logic block 417 may be sent to interface circuit 210. In some embodiments, a "0" output may indicate that an islanding condition occurs, and may accordingly trigger interface circuit 210 to open output contactor 180. Once output contactor 180 is physically open, switches 421-425 may be switched to a lower position. That is, feedback control scheme 400 may return to a "stand-alone" operation mode.

Under both operation modes (i.e., "stand-alone" and "grid-tie"), |V| determined by the reactive power loop and fv determined by the active power loop may be input to a pulse width modulator (PWM) 450. In some embodiments, a target initial phase for the inverter voltage may also be input to PWM 450. For example, an initial phase of 0 may be input to PWM 450. Consistent with the present disclosure, PWM may derive IGBT switching pulses based on the desired inverter voltage amplitude |V|, inverter voltage frequency fv, and initial voltage phase. The derived switching pulses may be provided to the gate of each IGBT in power inverter 140, via interface circuit 210.

Figure 5:
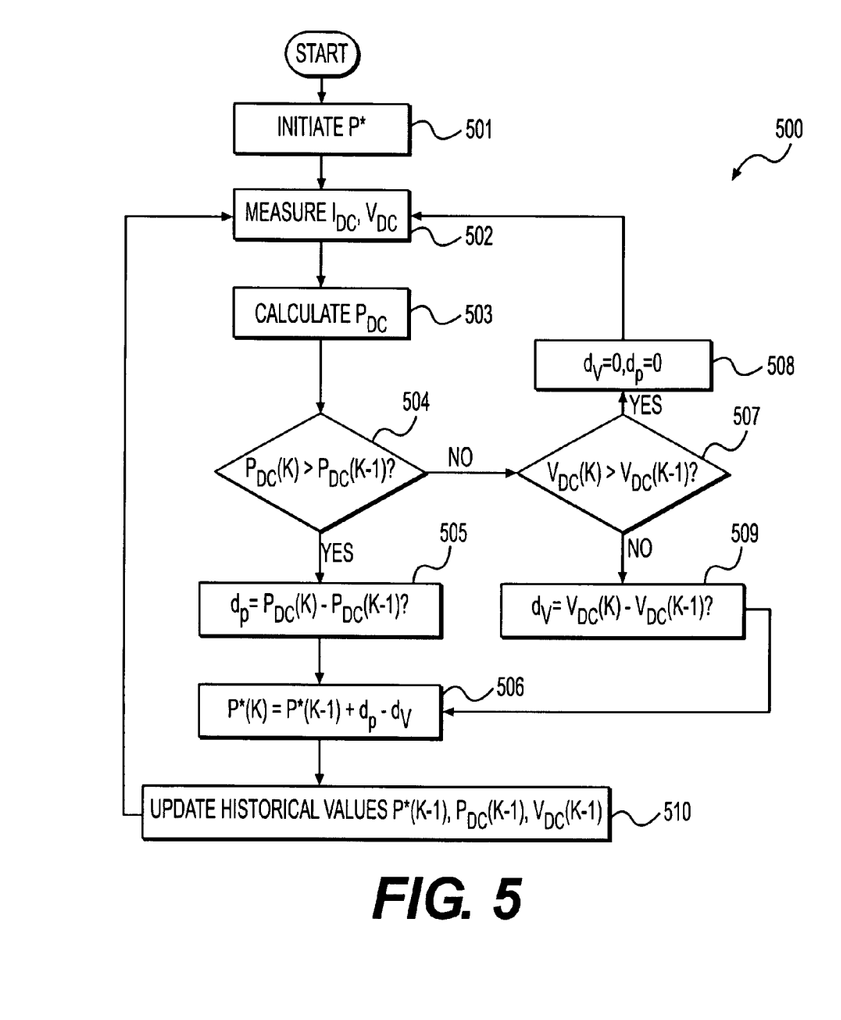
FIG. 5 provides a flowchart illustrating an exemplary maximum point power tracking process, consistent with an embodiment of the present disclosure.

Various algorithms may be used to determine the reference active power P* used in feedback control scheme 400. Consistent with the present disclosure, a maximum point power tracking (MPPT) scheme may be used. The MPPT scheme may harness the DC power input supplied by power sources 110 and 120 to the maximum extent. FIG. 5 provides a flowchart illustrating an exemplary MPPT process 500, consistent with an embodiment of the present disclosure. MPPT process 500 may begin when the reference active power P* is initiated (Step 501). For example, P* may be initiated as 0. Controller 200 may periodically request a DC voltage measurement and a DC current measurement (Step 502). For example, the DC voltage $V_{DC}$ may be measured by voltage sensor 171 and the DC current may be measured by current sensor 181. Consistent with the present disclosure, each periodically measured DC voltage $V_{DC}$ may be temporarily stored in RAM 202 or in database 205.

Controller 200 may compute a DC power based on the measured DC voltage and DC current (Step 503). For example, the DC power may be calculated as the product of the DC voltage and the DC current. Consistent with the present disclosure, each periodically computed DC power may be temporarily stored in RAM 202 or in database 205. In step 504, the current DC power value $P_{DC}(k)$ may be compared to the most recently stored value $P_{DC}(k-1)$. If $P_{DC}(k) > P_{DC}(k-1)$ (Step 504: Yes), MPPT process may proceed to step 505. In step 505, controller 200 may compute a derivative dp. For example, dp may be determined as the difference between $P_{DC}(k)$ and $P_{DC}(k-1)$. The reference active power P* may then be updated with dp (Step 506). For example, a current value of P*, P*(k), may be determined by adding dp to the most recent value P*(k-1). Consistent with the present disclosure, each periodically updated P* may be temporarily stored.

If $P_{DC}(k) \leq P_{DC}(k-1)$ (Step 504: No), controller 200 may compare the current measurement of DC voltage with the most recent measurement (Step 507). If $V_{DC}(k) > V_{DC}(k-1)$ (Step 507: Yes), controller 200 may set both derivative dp and derivative dv to 0 (Step 508). MPPT process 500 may then return to step 502 to measure the next DC voltage and DC current. Otherwise, if $V_{DC}(k) \leq V_{DC}(k-1)$ (Step 507: No), controller 200 may compute the derivative dv. For example, dv may be determined as the difference between $V_{DC}(k)$ and $V_{DC}(k-1)$. In step 509, the reference active power P* may then be updated with dv, instead of dp. For example, current value P*(k) may be determined by subtracting dv from the most recent value P*(k-1). After step 509, historical values of reference active power P*(k-1), $P_{DC}(k-1)$ and $V_{DC}(k-1)$ may be updated (Step 510). For example, the current values P*(k), $P_{DC}(k)$ and $V_{DC}(k)$ will be used to replace the old values. After step 510, MPPT process 500 may return to step 502 to measure the next DC voltage and DC current. Steps 502-510 may be iterated until the peak value of DC power is found.

INDUSTRIAL APPLICABILITY

Although the disclosed embodiments are described in association with transition between a "stand-alone" operation mode and a "grid-tie" operation mode, they may be applied to any applications where reliable power inverter control may be needed or beneficial. For example, the disclosed embodiments may be applied to make seamless transitions when any changes occur to power system 100, such as increased/reduced loads at grid 190, addition/removal of power sources at grid 190, addition/removal of power sources 110 and 120, etc.

Specifically, the disclosed control system for power inverter 140 may include a plurality of voltage sensors 172-175 configured to measure output line voltages and a plurality of current sensors 182-185 configured to measure output line currents of power system 100. The control system may further include a controller 200 coupled to power inverter 140. Controller 200 may be configured to provide a control signal associated with a disturbance frequency to power inverter 140. Controller 200 may be further configured to determine an output power of power inverter 140 based on the output line voltages and output line currents, and determine an amplitude of oscillation in the output power caused by the disturbance frequency. Controller 200 may also be configured to detect an islanding condition, if the amplitude of oscillation is below a threshold. The disclosed control system may further include an interface circuit 210 coupled to controller 200 and configured to disconnect grid 190 from power inverter 140 if the islanding condition is detected.

Consistent with the disclosed embodiments of the present disclosure, the disclosed power inverter control system may improve the reliability and robustness of power system 100. For example, using the power inverter control process 300 shown in FIG. 3 and feedback control scheme 400 illustrated in FIG. 4, the disclosed control system may effectively detect an islanding condition when grid 190 is suddenly disconnected. Once an islanding condition is detected, the control system may transit from a "grid-tie" control mode to a "stand-alone" control mode. In addition, the disclosed control system may determine a suitable target amplitude and target frequency for the output voltage of power inverter 140. As a result, the power transistors of power inverter 140 may be switched such that the output voltage complies with the load needs. Therefore, a voltage dip may not be present during the transition from the "grid-tie" operation mode to the "stand-alone" operation mode. As a result, problems such as local loads shut down may be avoided, and the reliability of power system 100 may be enhanced.

It will be apparent to those skilled in the art that various modifications and variations can be made to the disclosed power inverter control system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A control system for a power inverter, wherein the power inverter is configured to supply power to a grid, the control system comprising:
   a plurality of output voltage sensors and a plurality of output current sensors configured to measure output line voltages and output line currents of the power inverter;
   a controller coupled to the power inverter, the controller being configured to:
      provide a control signal associated with a disturbance frequency to the power inverter;
      determine an output power of the power inverter based on the output line voltages and the output line currents;
      determine an amplitude of oscillation in the output power caused by the disturbance frequency; and
      detect an islanding condition, if the amplitude of oscillation is below a threshold; and
   an interface circuit coupled to the controller and configured to disconnect the grid from the power inverter if the islanding condition is detected.

2. The control system of claim 1, wherein the controller being configured to determine the amplitude of oscillation further includes the controller being configured to:
   apply a band pass filter on the output power of the power inverter; and determine the amplitude of oscillation in the filtered output power,
wherein a pass band of the band pass filter is determined based on the disturbance frequency.

3. The control system of claim 1, wherein the disturbance frequency is a sinusoidal frequency.

4. The control system of claim 1, wherein the controller is further configured to:
   determine a target amplitude and a target frequency for an output voltage of the power inverter, if the grid is connected; and
   determine a plurality of power transistor switching pulses based on the target amplitude and the target frequency,
   wherein the interface circuit is further configured to provide the power transistor switching pulses to the power inverter.

5. The control system of claim 1, wherein the controller is further configured to:
   determine a nominal amplitude and a nominal frequency for an output voltage of the power inverter, when the grid is disconnected; and
   determine a plurality of power transistor switching pulses based on the nominal amplitude and the nominal frequency,
   wherein the interface circuit is further configured to provide the power transistor switching pulses to the power inverter.

6. The control system of claim 4, wherein the power inverter is further connected to at least one power source, wherein the power source supplies DC power to the power inverter.

7. The control system of claim 6, wherein the power source is a photovoltaic power source or a fuel cell power source.

8. The control system of claim 6, wherein the control system further includes:
   an input voltage sensor configured to measure a DC voltage supplied by the power source and an input current sensor configured to measure a DC current supplied by the power source,
   wherein the controller being configured to determine the target frequency includes the controller being configured to:
      determine a reference active power based on the DC voltage and the DC current;
      calculate an active power based on the output line voltages and the output line currents; and
      match the active power with the reference active power using a feedback control loop.

9. The control system of claim 8, wherein the feedback control loop includes an integration loop and a frequency droop loop, wherein the frequency droop loop includes a low pass filter.

10. The control system of claim 4, wherein the controller being configured to determine the target amplitude includes the controller being configured to:
    determine a reference reactive power using power factor correction;
    calculate a reactive power based on the output line voltages and the output line currents; and
    match the reactive power with the reference reactive power using a feedback control loop.

11. The control system of claim 10, wherein the feedback control loop includes an integration loop and a voltage droop loop, wherein the voltage droop loop includes a low pass filter.

12. A control method for a power inverter, wherein the power inverter is configured to supply power to a grid, the control method comprising:
    providing a control signal associated with a disturbance frequency to the power inverter;
    determining an amplitude of oscillation in an output power of the power inverter, wherein the oscillation is caused by the disturbance frequency;
    detecting an islanding condition, if the amplitude of oscillation is below a threshold; and
    disconnecting the grid from the power inverter if the islanding condition is detected.

13. The control method of claim 12, wherein determining the amplitude of oscillation in the output power includes:
    measuring output line voltages and output line currents of the power inverter;
    determining the output power of the power inverter based on the output line voltages and the output line currents;
    applying a band pass filter on the output power; and
    determining the amplitude of oscillation in the filtered output power,
    wherein a pass band of the band pass filter is determined based on the disturbance frequency.

14. The control method of claim 12, further comprising:
    determining a target amplitude and a target frequency for an output voltage of the power inverter, if the grid is connected;
    determining a plurality of power transistor switching pulses based on the target amplitude and the target frequency; and
    providing the power transistor switching pulses to the power inverter.

15. The control method of claim 12, further comprising:
    determining a nominal amplitude and a nominal frequency for an output voltage of the power inverter, when the grid is disconnected;
    determining a plurality of power transistor switching pulses based on the nominal amplitude and the nominal frequency; and
    providing the power transistor switching pulses to the power inverter.

16. The control method of claim 14, wherein determining the target frequency includes:
    measuring a DC voltage and a DC current supplied by a power source to the power inverter; and
    determining a reference active power based on the DC voltage and the DC current.

17. The control method of claim 16, wherein determining the reference active power includes:
    initiating the reference active power;
    calculating a DC power based on the DC voltage and the DC current; and
    updating the reference active power with a derivative of the DC power or a derivative of the DC voltage, if the DC power increases.

18. The control method of claim 16, wherein determining the target frequency further includes:
    calculating an active power based on the output line voltages and the output line currents; and
    matching the active power with the reference active power using a feedback control loop,
    wherein the feedback control loop includes an integration loop and a frequency droop loop, wherein the frequency droop loop includes a low pass filter.

19. The control method of claim 14, wherein determining the target amplitude includes:

calculating a reactive power based on the output line voltages and the output line currents; and matching the reactive power with a reference reactive power using a feedback control loop, wherein the feedback control loop includes an integration loop and a voltage droop loop, wherein the voltage droop loop includes a low pass filter.

20. A power system, comprising:

at least one power source;

a power inverter coupled to the at least one power source;

a grid connected to the power inverter;

a control system for the power inverter, configured to:

provide a control signal associated with a disturbance frequency to the power inverter;

determine an amplitude of oscillation in an output power of the power inverter, wherein the oscillation is caused by the disturbance frequency;

detect an islanding condition, if the amplitude of oscillation is below a threshold; and disconnect the grid from the power inverter if the islanding condition is detected.

* * * * *